(12) United States Patent
Duque Biarge et al.

(10) Patent No.: US 10,962,641 B2
(45) Date of Patent: Mar. 30, 2021

(54) VEHICLE RADAR SENSING SYSTEM WITH ENHANCED ACCURACY USING INTERFEROMETRY TECHNIQUES

(71) Applicant: Magna Electronics Inc., Auburn Hills, MI (US)

(72) Inventors: Sergio Duque Biarge, Munich (DE); Jagmal Singh, Aschaffenburg (DE); Holger Hess, Aschaffenburg (DE); Jorge J. Jácome Muñoz, Aschaffenburg (DE); Kalin Kabakchiev, Frankfurt am Main (DE); Roaldje Nadjiasngar, Aschaffenburg (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 301 days.

(21) Appl. No.: 16/123,255

(22) Filed: Sep. 6, 2018

(65) Prior Publication Data

US 2019/0072667 A1 Mar. 7, 2019

Related U.S. Application Data

(60) Provisional application No. 62/555,221, filed on Sep. 7, 2017.

(51) Int. Cl.
*G01S 13/931* (2020.01)
*G01S 13/44* (2006.01)
(Continued)

(52) U.S. Cl.
CPC ........ *G01S 13/931* (2013.01); *G01S 13/4454* (2013.01); *G01S 13/505* (2013.01);
(Continued)

(58) Field of Classification Search
CPC ............... G01S 13/4454; G01S 13/505; G01S 13/9011; G01S 13/931; G01S 2013/9314;
(Continued)

(56) References Cited

U.S. PATENT DOCUMENTS

| 4,943,796 A | 7/1990 | Lee |
| 5,550,677 A | 8/1996 | Schofield et al. |

(Continued)

FOREIGN PATENT DOCUMENTS

| EP | 1506893 A2 | 2/2005 |
| WO | 2011090484 A1 | 7/2011 |

(Continued)

OTHER PUBLICATIONS

Rapp et al. "Probabilistic ego-motion estimation using multiple automotive radar sensors." Robotics and Autonomous Systems 89, 136-146, 2017.

(Continued)

*Primary Examiner* — Timothy X Pham
(74) *Attorney, Agent, or Firm* — Honigman LLP

(57) ABSTRACT

A sensing system for a vehicle includes at least one radar sensor disposed at the vehicle and having a field of sensing exterior of the vehicle. The at least one radar sensor includes multiple transmitting antennas and multiple receiving antennas. The transmitting antennas transmit signals and the receiving antennas receive the signals reflected off objects. Multiple scans of radar data sensed by the at least one radar sensor are received at a control, and a vehicle motion estimation is received at the control. The control, responsive to received scans of sensed radar data, detects the presence of one or more objects exterior the vehicle and within the field of sensing of the at least one radar sensor. The control, responsive to the received scans of sensed radar data and the received vehicle motion estimation, matches objects (Continued)

detected in the scans and determines angles toward the detected objects.

16 Claims, 3 Drawing Sheets

(51) Int. Cl.
*G01S 13/90* (2006.01)
*G01S 13/50* (2006.01)

(52) U.S. Cl.
CPC ..... *G01S 13/9011* (2013.01); *G01S 2013/932* (2020.01); *G01S 2013/9314* (2013.01); *G01S 2013/9315* (2020.01); *G01S 2013/9317* (2013.01)

(58) Field of Classification Search
CPC ..... G01S 2013/9315; G01S 2013/9317; G01S 2013/932; G01S 2013/9353
See application file for complete search history.

(56) References Cited

U.S. PATENT DOCUMENTS

| | | | |
|---|---|---|---|
| 5,585,798 A | 12/1996 | Yoshioka et al. | |
| 5,670,935 A | 9/1997 | Schofield et al. | |
| 5,715,093 A | 2/1998 | Schierbeek et al. | |
| 5,796,094 A | 8/1998 | Schofield et al. | |
| 5,877,897 A | 3/1999 | Schofield et al. | |
| 5,949,331 A | 9/1999 | Schofield et al. | |
| 6,057,754 A | 5/2000 | Kinoshita et al. | |
| 6,067,110 A | 5/2000 | Nonaka et al. | |
| 6,085,151 A | 7/2000 | Farmer et al. | |
| 6,097,023 A | 8/2000 | Schofield et al. | |
| 6,118,401 A | 9/2000 | Tognazzini | |
| 6,118,410 A | 9/2000 | Nagy | |
| 6,201,642 B1 | 3/2001 | Bos | |
| 6,216,540 B1 | 4/2001 | Nelson et al. | |
| 6,313,454 B1 | 11/2001 | Bos et al. | |
| 6,353,392 B1 | 3/2002 | Schofield et al. | |
| 6,396,397 B1 | 5/2002 | Bos et al. | |
| 6,492,935 B1 | 12/2002 | Higuchi | |
| 6,498,620 B2 | 12/2002 | Schofield et al. | |
| 6,580,385 B1 | 6/2003 | Winner et al. | |
| 6,587,186 B2 | 7/2003 | Bamji et al. | |
| 6,674,895 B2 | 1/2004 | Ratii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,710,770 B2 | 3/2004 | Tomasi et al. | |
| 6,717,610 B1 | 4/2004 | Bos et al. | |
| 6,757,109 B2 | 6/2004 | Bos | |
| 6,771,208 B2 | 8/2004 | Lutter et al. | |
| 6,795,014 B2 | 9/2004 | Cheong | |
| 6,825,455 B1 | 11/2004 | Schwarte | |
| 6,831,591 B2 | 12/2004 | Horibe | |
| 6,876,775 B2 | 4/2005 | Torunoglu | |
| 6,903,677 B2 | 6/2005 | Takashima et al. | |
| 6,906,793 B2 | 6/2005 | Bamji et al. | |
| 6,919,549 B2 | 7/2005 | Bamji et al. | |
| 6,941,211 B1 | 9/2005 | Kuroda et al. | |
| 6,946,978 B2 | 9/2005 | Schofield | |
| 7,004,606 B2 | 2/2006 | Schofield | |
| 7,005,974 B2 | 2/2006 | McMahon et al. | |
| 7,012,560 B2 | 3/2006 | Braeuchle et al. | |
| 7,038,577 B2 | 5/2006 | Pawlicki et al. | |
| 7,042,389 B2 | 5/2006 | Shirai | |
| 7,053,357 B2 | 5/2006 | Schwarte | |
| 7,123,168 B2 | 10/2006 | Schofield | |
| 7,157,685 B2 | 1/2007 | Bamji et al. | |
| 7,176,438 B2 | 2/2007 | Bamji et al. | |
| 7,176,830 B2 | 2/2007 | Horibe | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,432,848 B2 | 10/2008 | Munakata | |
| 7,526,103 B2 | 4/2009 | Schofield et al. | |
| 7,613,568 B2 | 11/2009 | Kawasaki | |
| 7,706,978 B2 | 4/2010 | Schiffmann et al. | |
| 7,765,065 B2 | 7/2010 | Stiller | |
| 8,013,780 B2 | 9/2011 | Lynam | |
| 8,027,029 B2 | 9/2011 | Lu et al. | |
| 8,698,894 B2 | 4/2014 | Briggance | |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 2003/0138132 A1 | 7/2003 | Stam et al. | |
| 2003/0201929 A1 | 10/2003 | Lutter et al. | |
| 2005/0104089 A1 | 5/2005 | Engelmann et al. | |
| 2006/0091654 A1 | 5/2006 | De Mersseman et al. | |
| 2010/0001897 A1 | 1/2010 | Lyman | |
| 2010/0245066 A1 | 9/2010 | Sarioglu et al. | |
| 2011/0037640 A1 | 2/2011 | Schmidlin | |
| 2013/0215271 A1 | 8/2013 | Lu | |
| 2013/0246020 A1* | 9/2013 | Zeng | G01S 17/66 703/2 |
| 2015/0054672 A1* | 2/2015 | Nakahama | G01S 7/2923 342/27 |
| 2016/0018524 A1* | 1/2016 | Zeng | G01S 17/931 356/4.01 |
| 2016/0109571 A1* | 4/2016 | Zeng | G01S 13/87 342/71 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0059236 A1 | 3/2018 | Wodrich et al. | |
| 2018/0065623 A1 | 3/2018 | Wodrich et al. | |
| 2018/0067194 A1 | 3/2018 | Wodrich et al. | |
| 2018/0231635 A1 | 8/2018 | Woehlte | |
| 2019/0072666 A1 | 3/2019 | Duque Biarge et al. | |
| 2019/0072668 A1 | 3/2019 | Duque Biarge et al. | |
| 2019/0072669 A1 | 3/2019 | Duque Biarge et al. | |

FOREIGN PATENT DOCUMENTS

| | | | |
|---|---|---|---|
| WO | WO 2018/0182722 | * | 3/2017 |
| WO | 2018007995 A1 | | 1/2018 |

OTHER PUBLICATIONS

Das et al., "Scan registration with multi-scale k-means normal distributions transform." Intelligent Robots and Systems (IROS), 2012 IEEE/RSJ International Conference on. IEEE, 2012.

Lundquist et al., "Estimation of the free space in front of a moving vehicle." 2009.

Schreier et al., "Robust free space detection in occupancy grid maps by methods of image analysis and dynamic B-spline contour tracking." Intelligent Transportation Systems (ITSC), 2012 15th International IEEE Conference on. IEEE, 2012.

* cited by examiner

VEHICLE RADAR SENSING SYSTEM WITH ENHANCED ACCURACY USING INTERFEROMETRY TECHNIQUES

CROSS REFERENCE TO RELATED APPLICATION

The present application claims the filing benefits of U.S. provisional application Ser. No. 62/555,221, filed Sep. 7, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module or system disposed at the vehicle and comprising at least one radar sensor disposed at the vehicle and having a field of sensing exterior of the vehicle. The at least one radar sensor comprises multiple transmitting (Tx) antennas (transmitters) and receiving (Rx) antennas (receivers) to provide high definition, fine resolution in azimuth and/or elevation to determine high definition radar reflection responses for objects and surfaces detected by the system. The system includes a control, where outputs (such as radar data acquisitions of multiple scans) of the at least one radar sensor are communicated to the control, and where the control, responsive to the outputs of the at least one radar sensor, detects the presence of objects in the field of sensing of the radar sensor or sensors. The system uses multiple scans to generate a virtual array by the vehicle position change between the scans. The system provides enhanced accuracy in determining the location of a detected object relative to the vehicle and sensor(s).

The present invention provides a means to substantially or drastically refine target accuracy in automotive radar. The dimensions that can be improved using the system of the present invention include target Doppler velocity and angular estimation in azimuth and elevation angles. The improvement of these accuracies help to precisely locate a target in space. The refinement of target positioning and target velocity yield easier target tracking. This is directly related to a boost in the tracker performance.

These and other objects, advantages, purposes and features of the present invention will become apparent upon review of the following specification in conjunction with the drawings.

DESCRIPTION OF THE PREFERRED EMBODIMENTS

Figure 1:
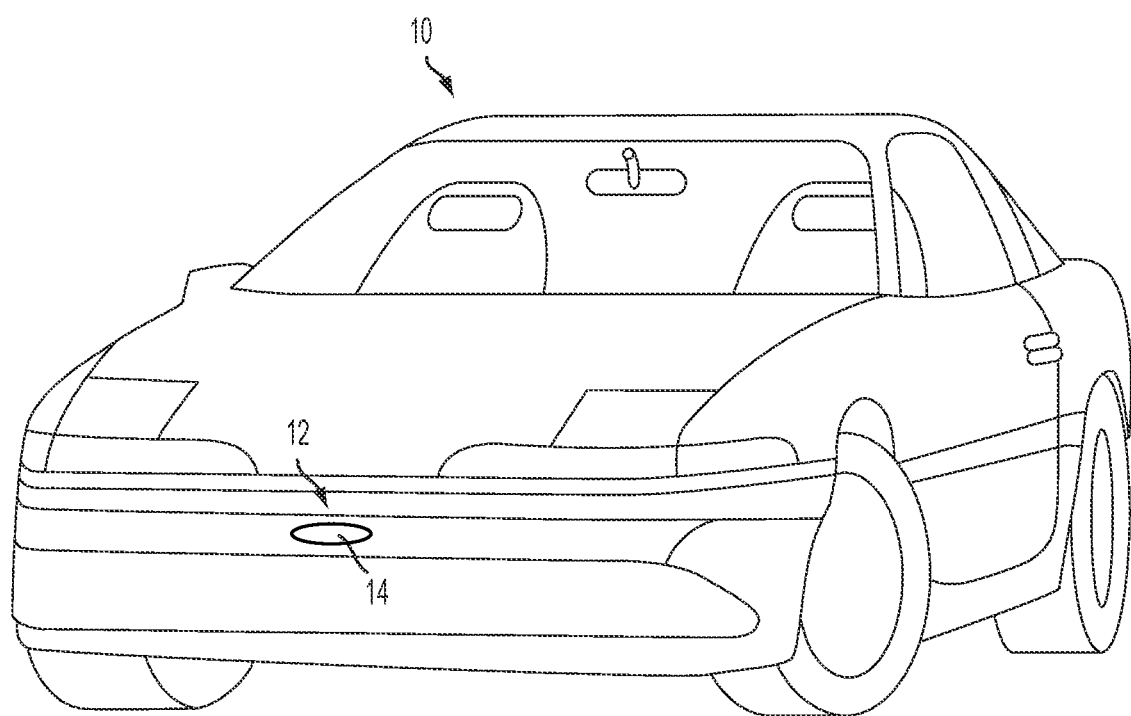
FIG. 1 is a perspective view of a vehicle with a sensing system that incorporates a radar sensor in accordance with the present invention.

A vehicle sensing system, such as a driver assist system, object detection system, parking assist system and/or alert system, operates to capture sensing data exterior of the vehicle and may process the captured data to detect objects or other vehicles at or near the equipped vehicle and in the predicted path of the equipped vehicle, such as to assist a driver of the equipped vehicle in maneuvering the vehicle in a forward or rearward direction or to assist the driver in parking the vehicle in a parking space. The system includes a processor that is operable to receive sensing data from one or more sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors, such as multiple exterior facing radar sensors or cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars.

The algorithms to estimate target positioning and target velocity on automotive radar typically use a single scan coherently or a set of scans incoherently. Coherent single scan algorithms use the complex values of different antenna phase centers for a particular range and then carries out beamforming in order to obtain the target's angular position. In this case, the angular accuracy is driven by the physical antenna array and the target's Signal-to-Noise Ratio (SNR). The integration scan time and target's SNR determine the target's Doppler accuracy. The second type of target positioning and Doppler estimator (incoherent set of scans) uses as an input a set of target list outputs from different scans. Thus, the values for every target are Doppler and Angle(s) (Azimuth Angle and potentially Elevation Angle for some sensors). The values are obtained independently for every scan and integrated through time. Thus, the accuracies are given by the incoherent sum of input accuracies.

The system of the present invention uses the coherent integration through different sets of scans. In that way, a virtual array is generated by the vehicle position change between scans. For example, a vehicle moving at 80 km/h with a radar scan time of 30 ms yields a virtual array size of 0.67 meters (i.e., the vehicle moves 0.67 meters every 30 ms). Thus, the virtual array in a different line of sight (LOS) direction is significantly larger with respect to the physical antenna. In terms of Doppler velocity, the improvement is achieved by having two scans that increase the scan integration time. In that dimension, the system of the present invention has increased performance as compared to the incoherent algorithms that use several scans to better estimate the accuracies. The improvement, in part, comes from having a larger integration time.

To increase target accuracy, the targets or objects are first matched between scans. Then interferometric data is generated. The interferometric phase for each target and each selected pairs of scans is generated by multiplying a scan's complex values of the target peak after beamforming by the conjugate of the scan's corresponding complex value of its scan pair. The number of independent interferometric phases gives the rank of the equation that the system is to solve. Thus, if, for example, the number of dimensions to be improved is three (e.g., Doppler Velocity, Azimuth angle and Elevation angle), the system needs at least three independent interferometric phases. In that example, the number of scans to group would be at least four.

The system of the present invention receives as inputs an ego motion estimation (an estimation of the motion of the measuring sensor that is disposed at the equipped or subject vehicle), a time stamp of each data acquisition or scan, a detection list for each scan with detected targets' positions, Doppler velocity and complex value after beamforming, and a sensor position of the measuring sensor with respect to the vehicle.

The dataflow includes, first, matching the targets or objects between scans. The interferometric phase is generated as previously described. The scans may be paired in different ways, for example, by pairing consecutive scans in order to minimize time decorrelation and the amount of data.

The next step is to "flatten" the interferometric phases by taking into account the vehicle movement and the estimated target positioning by the scans. This "phase flattening" can be done as a geometric approach by taking into account the different positions of the radar sensor and targets or objects.

The residual interferometric phases are related to the discrepancies of the estimated values and noise. An assessment to check if it is possible to correctly unwrap the residues is performed. In essence, this tests if the input accuracy can guarantee that the interferometric equation system can be solved unambiguously. Targets or objects with high SNR are more likely to be solved unambiguously. Then, the interferometric system is solved and provides as outputs the discrepancies of the dimensions introduced in the model with respect to the values used in the "phase flattening." Finally, the obtained discrepancies is added to the values used for "phase flattening" to get the absolute values.

Figure 2:
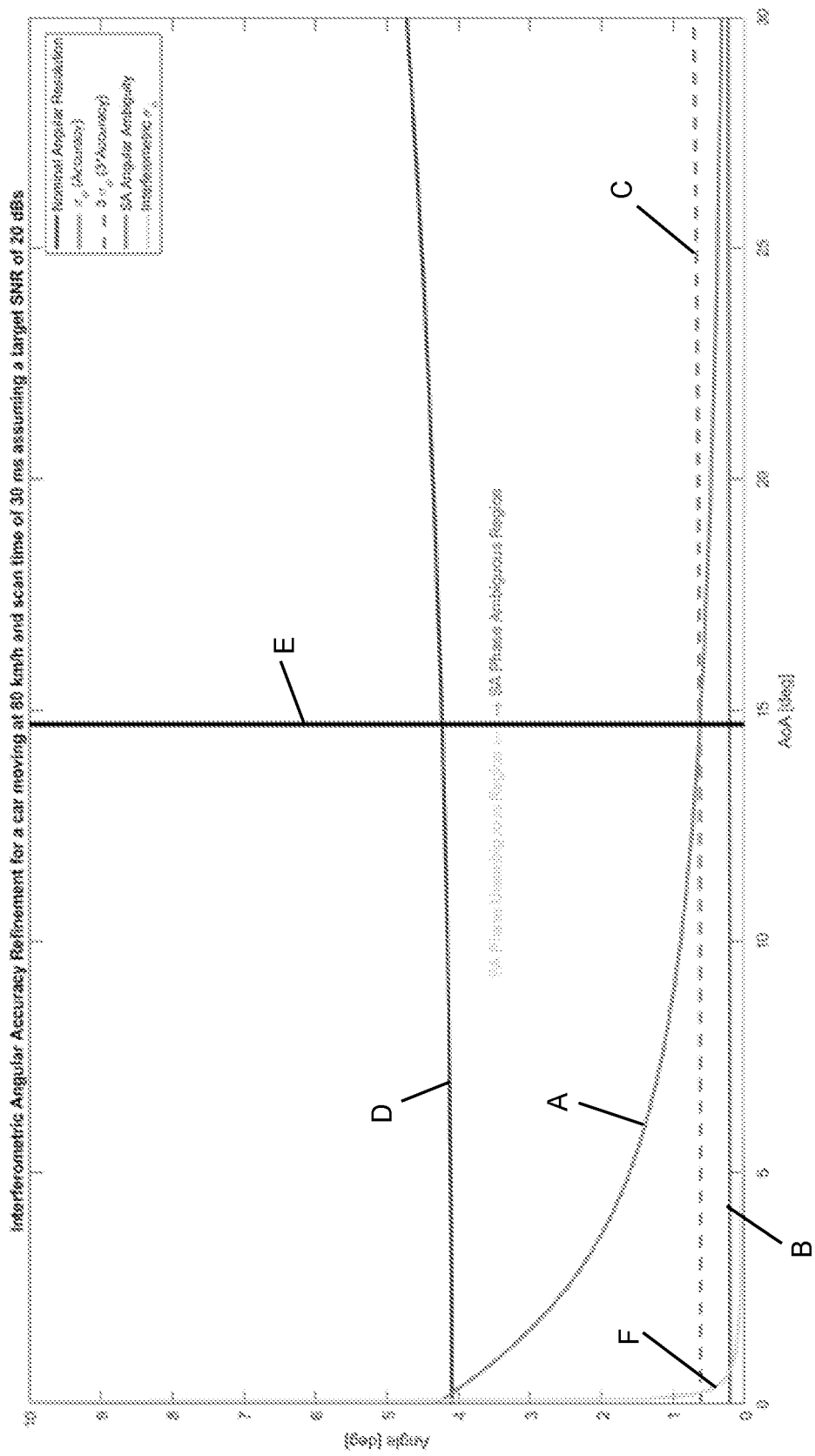
FIG. 2 is a graph showing azimuth angle of arrival accuracy comparison between the present invention and a single scan estimation for a target with a signal to noise ratio (SNR) of 20 dBs.
Figure 3:
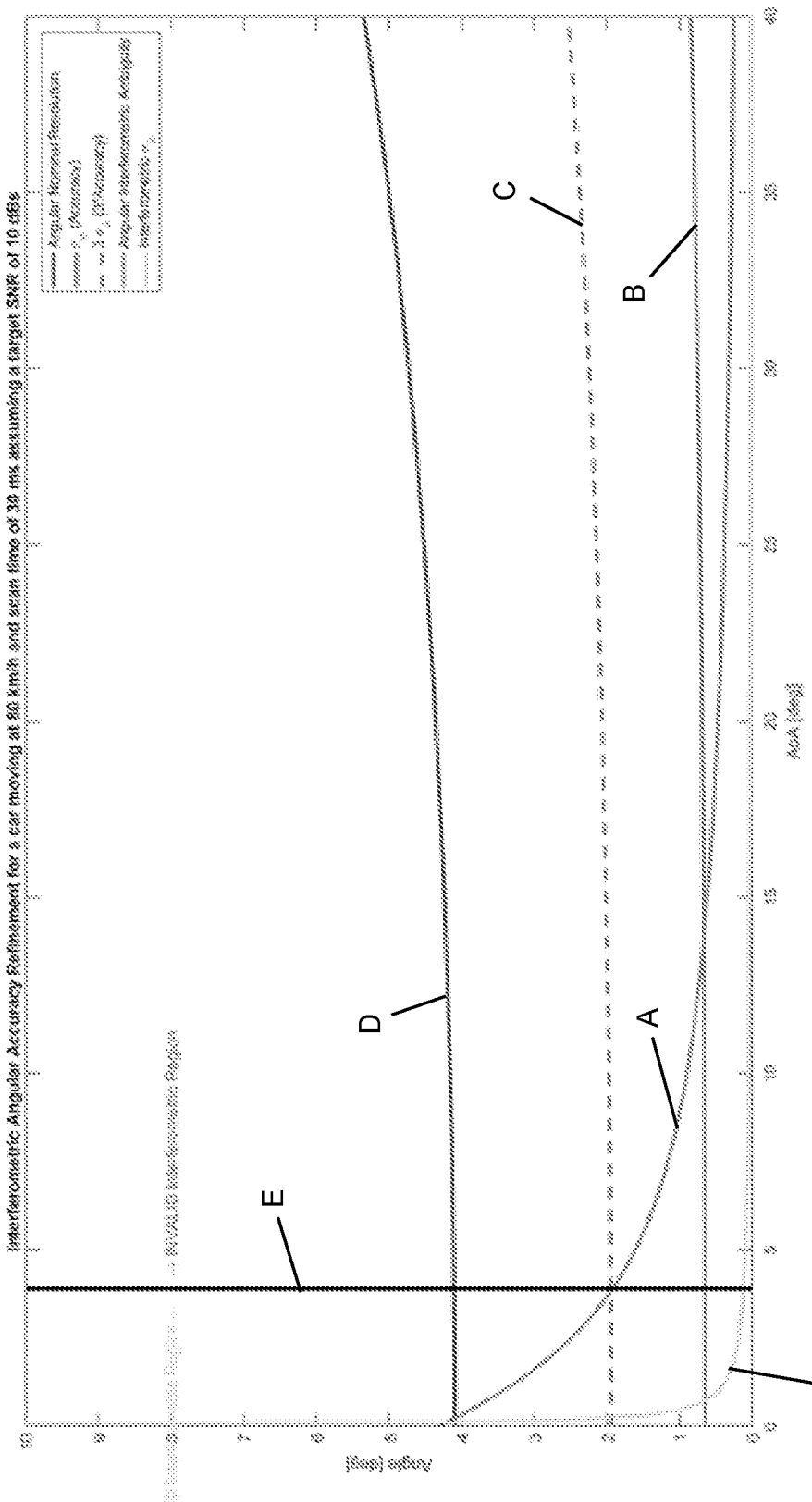
FIG. 3 is a graph showing azimuth angle of arrival accuracy comparison between the present invention and a single scan estimation for a target with a SNR of 10 dBs.

For example, for an Azimuth dimension, the following parameters may be taken into account: a vehicle velocity of 80 km/h, a scan time of 30 ms, a sensor frequency of 79 GHz (i.e., a wavelength of 3.8 mm), 7 physical phase centers, and a 2 wavelength separation between physical phase centers. FIGS. 2 and 3 show the accuracy improvement vs target Azimuth Angle of Arrival (AoA) assuming a 20 dBs SNR (FIG. 2) and a 10 dBs SNR (FIG. 3). The SA Angular Ambiguity curve A is the interferometric ambiguity with respect to the AoA.

In order to assure that it is possible to unwrap the residual interferometric phase, the maximum error of the provided Azimuth angle by each scan has to be below this SA Angular Ambiguity line. The accuracy (one standard deviation) of a single scan AoA is plotted as a solid line B while the maximum error (three standard deviations) is plotted as a dotted line C. The accuracy and maximum error have the same shape as the nominal angular resolution line D. There is a scale factor depending on the target SNR. The solid vertical line E separates the angular area where the interferometric phase can be solved unambiguously (left side) and where it cannot be solved unambiguously (right side). The two accuracies to compare are the minimum error line B and the interferometric line F. A substantial azimuth accuracy improvement is readily achieved for targets or objects with low SNR.

Thus, the present invention refines accuracy in detecting targets or objects with automotive radar. The dimensions that are improved are, for example, target Doppler velocity and angular estimation in azimuth and elevation angles. The accuracy improvement helps to precisely localize a target in space. The refinement of target positioning and target velocity also yields easier target tracking. This directly leads to a boost in the tracker performance.

The system may provide an output for a driving assist system of the vehicle, such as one or more of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation. Optionally, the output may be provided to an autonomous vehicle control system.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system. The forward viewing camera and/or the sensor of the lane determining system may comprise one of the cameras and/or one of the sensors of the autonomous vehicle control system.

The sensing system may include a machine vision system (comprising at least one exterior viewing camera disposed at the vehicle and an image processor for processing image data captured by the at least one camera), where information is shared between the stereo radar and the machine vision system.

The system may include two or more individual radars, having individual or multiple Tx (transmitters) and Rx (receivers) on an antenna array, and may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:
   at least one radar sensor disposed at a vehicle equipped with said sensing system and having a field of sensing exterior of the equipped vehicle;
   wherein said at least one radar sensor comprises multiple transmitting antennas and multiple receiving antennas, and wherein said transmitting antennas transmit signals and said receiving antennas receive the signals reflected off objects;
   a control comprising a processor, wherein multiple scans of radar data sensed by said at least one radar sensor are received at said control and processed at the processor;
   wherein the received sensed radar data comprises radar data acquisitions for at least two consecutive scans by said at least one radar sensor;
   wherein said control generates interferometric phases by pairing scans and multiplying complex values of a target peak after beamforming of one scan of each pair by a conjugate of its corresponding complex value of the other scan of that pair;
   wherein a vehicle motion estimation is received at said control;
   wherein said control, responsive to processing at the processor of the received multiple scans of sensed radar data, detects the presence of one or more objects exterior the equipped vehicle and within the field of sensing of said at least one radar sensor; and
   wherein said control, responsive at least in part to processing at the processor of the received multiple scans of sensed radar data and the received vehicle motion estimation, matches objects detected in the multiple scans and determines angles toward the detected objects.

2. The sensing system of claim 1, wherein each radar data acquisition is time stamped.

3. The sensing system of claim 2, wherein said control determines the angles toward the detected objects responsive to a sensor position of said at least one sensor at the equipped vehicle.

4. The sensing system of claim 1, wherein said control flattens the interferometric phases by taking into account the vehicle motion and estimated target positioning by the scans.

5. The sensing system of claim 4, wherein said control determines if residual interferometric phases can be unwrapped.

6. The sensing system of claim 5, wherein, responsive to determination that residual interferometric phases can be unwrapped, said control unwraps the residual interferometric phases.

7. The sensing system of claim 1, wherein said control provides enhanced accuracy for at least one selected from the group consisting of (i) Doppler velocity of a detected target, (ii) azimuth angle of a detected target and (iii) elevation angle of a detected target.

8. The sensing system of claim 1, wherein a vision system of the equipped vehicle comprises at least one exterior viewing camera disposed at the equipped vehicle and an image processor for processing image data captured by the at least one camera, and wherein information is shared between said sensing system and the vision system of the equipped vehicle.

9. The sensing system of claim 1, wherein said sensing system comprises two or more individual radar sensors, each having multiple transmitting antennas and receiving antennas on an antenna array, and wherein information is shared between the individual radars operating in stereo to determine high definition radar reflection responses for objects detected by said sensing system.

10. The sensing system of claim 1, wherein said at least one radar sensor is disposed at a front portion of the equipped vehicle and senses forward of the equipped vehicle.

11. The sensing system of claim 1, wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

12. A sensing system for a vehicle, said sensing system comprising:
   at least one radar sensor disposed at a vehicle equipped with said sensing system and having a field of sensing exterior of the equipped vehicle;
   wherein said at least one radar sensor comprises multiple transmitting antennas and multiple receiving antennas, and wherein said transmitting antennas transmit signals and said receiving antennas receive the signals reflected off objects;
   a control comprising a processor, wherein multiple scans of radar data sensed by said at least one radar sensor are received at said control and processed at the processor;
   wherein each radar data acquisition is time stamped;
   wherein a vehicle motion estimation is received at said control;
   wherein said control, responsive to processing at the processor of the received multiple scans of sensed radar data, detects the presence of one or more objects exterior the equipped vehicle and within the field of sensing of said at least one radar sensor;
   wherein said control, responsive at least in part to processing at the processor of the received multiple scans of sensed radar data and the received vehicle motion estimation, matches objects detected in the multiple scans and determines angles toward the detected objects;

wherein said control generates interferometric phases by pairing scans and multiplying complex values of a target peak after beamforming of one scan of each pair by a conjugate of its corresponding complex value of the other scan of that pair, and wherein said control flattens the interferometric phases by taking into account the vehicle motion and estimated target positioning by the scans;

wherein said control determines the angles toward the detected objects responsive to a sensor position of said at least one sensor at the equipped vehicle; and wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

13. The sensing system of claim 12, wherein said control determines if residual interferometric phases can be unwrapped.

14. The sensing system of claim 13, wherein, responsive to determination that residual interferometric phases can be unwrapped, said control unwraps the residual interferometric phases.

15. The sensing system of claim 12, wherein said control provides enhanced accuracy for at least one selected from the group consisting of (i) Doppler velocity of a detected target, (ii) azimuth angle of a detected target and (iii) elevation angle of a detected target.

16. The sensing system of claim 12, wherein a vision system of the equipped vehicle comprises at least one exterior viewing camera disposed at the equipped vehicle and an image processor for processing image data captured by the at least one camera, and wherein information is shared between said sensing system and the vision system of the equipped vehicle.

* * * * *